United States Patent [19]
Kraft et al.

[11] Patent Number: 5,471,932
[45] Date of Patent: Dec. 5, 1995

[54] GAS GENERATOR, ESPECIALLY FOR AN AIRBAG

[75] Inventors: Josef Kraft, Berg; Gerrit Scheiderer, Fürth, both of Germany

[73] Assignee: Dynamit Nobel Aktiengesellschaft, Troisdorf, Germany

[21] Appl. No.: 279,002

[22] Filed: Jul. 22, 1994

[30] Foreign Application Priority Data

Jul. 22, 1993 [DE] Germany .................. 43 24 554.4

[51] Int. Cl.⁶ ............................................ C06D 5/00
[52] U.S. Cl. ..................... 102/531; 280/741; 422/165
[58] Field of Search .................................. 102/530, 531; 280/736, 740, 741, 742; 422/164–165

[56] References Cited

U.S. PATENT DOCUMENTS

| | | | |
|---|---|---|---|
| 4,158,696 | 6/1979 | Wilheim | 280/736 |
| 4,817,828 | 4/1989 | Goetz | 280/736 |
| 4,950,458 | 8/1990 | Cunningham | 102/530 |
| 4,998,751 | 3/1991 | Daxton et al. | 280/741 |
| 5,100,171 | 3/1992 | Faigle et al. | |
| 5,253,895 | 10/1993 | Bretfeld et al. | 280/736 |
| 5,308,370 | 5/1994 | Kraft et al. | 280/740 |
| 5,345,875 | 9/1994 | Anderson | 102/530 |

FOREIGN PATENT DOCUMENTS

| | | |
|---|---|---|
| 0012626 | 6/1980 | European Pat. Off. . |
| 0582861 | 2/1994 | European Pat. Off. . |

*Primary Examiner*—Harold J. Tudor
*Attorney, Agent, or Firm*—Antonelli, Terry, Stout & Kraus

[57] ABSTRACT

A gas generator, especially for an airbag of a vehicle having a cylindrical outer tube, open end faces of which are closed by cover elements, comprising an inner tube of smaller diameter which is arranged coaxially inside the outer tube and which has outflow openings, an ignitable gas-generating material inside the inner tube, filter elements in an annular space arranged between the inner tube and the outer tube, and an igniter unit for igniting the gas-generating material. In order to improve the damming and sealing of the outflow openings, there is arranged in the inner tube a rolled-up, self overlapping damming strip adjoining the wall at least partially. Also, the outflow openings are covered on the outside of the inner tube by a sealing strip having at least two mutually overlapping portions of differing widths.

18 Claims, 3 Drawing Sheets

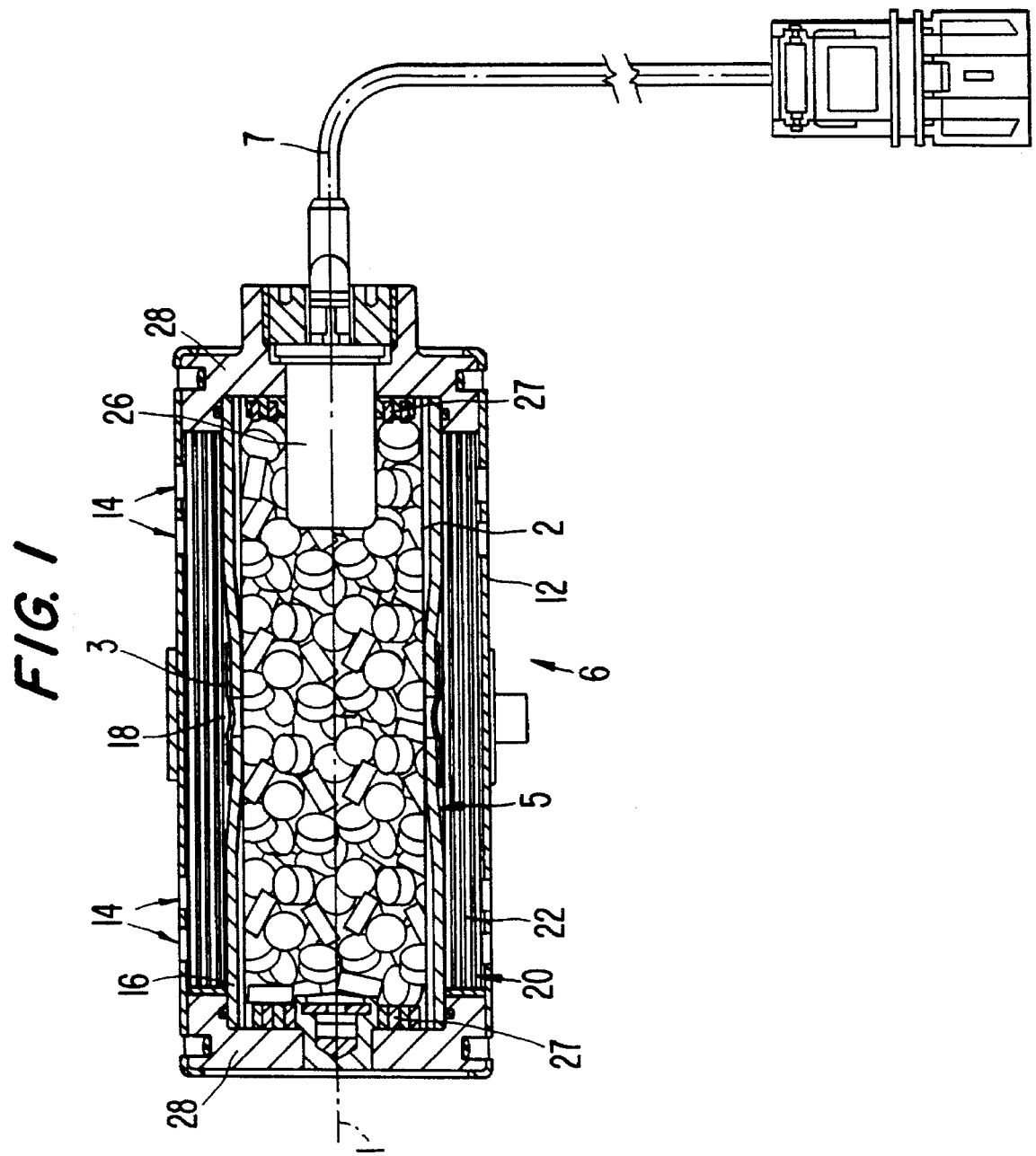

GAS GENERATOR, ESPECIALLY FOR AN AIRBAG

FIELD OF INVENTION

This invention relates to a gas generator having a cylindrical outer tube, open end faces of which are closed by cover elements, an inner tube of smaller diameter which is arranged coaxially inside the outer tube and which has outflow openings, an ignitable gas-generating material inside the inner tube, filter elements in an annular space between the inner tube and the outer tube, and an igniter unit for igniting the gas-generating material.

BACKGROUND OF THE INVENTION

A gas generator of the same type as the present is known for example, from DE 39 14 690 A1.

The known tubular gas generator has a cylindrical outer tube which constitutes the housing of the gas generator and open end faces of the housing are closed by cover elements. Arranged coaxially in the outer tube is a cylindrical inner tube of smaller diameter; this inner tube defines a combustion chamber in which is housed a gas-generating material ignitable by means of an igniter unit. The inner tube is provided with several outflow openings in a tube wall. In the annular space between the inner tube and the outer tube are filter elements which generally consist of a number of layers of wire mesh, steel wool and/or non-woven metal filament fabric. The combustion gas issuing from the outflow openings of the inner tube flows through the filter elements which trap the solid and liquid or condensed combustion products, and passes out, cleaned, via gas exit openings in the outer tube.

In order to maintain opening gas pressures for the airbag which are constant at all temperatures, it is known to close the outflow openings on the inside of the inner tube by means of narrow metal strips welded or glued in place.

A disadvantage of the use of such strips to provide damming is that with the known gas generators, it is virtually impossible to automate a welding or gluing procedure with an acceptable cost, so that the aforementioned method is much too complicated and thus is too expensive. Also, such narrow strips may not provide adequate damming.

It is also known to close the outflow openings on the outside of the inner tube by means of a narrow sealing strip, of uniform width. The strip is bonded to the inner tube by an adhesive. This is intended to prevent moisture from getting into the interior of the inner tube and into the gas-generating material. The sealing strip in this case is longer than the periphery of the inner tube so that there is an overlap.

Sealing against moisture, as heretofore described, has not proved adequate. It has been found that during a required storage time of 10 years, moisture is still able to penetrate and causes the gas-generating material to become unusable.

SUMMARY OF THE INVENTION

An object underlying the present invention, therefore, is to improve a known gas generator in such a way that with simple and inexpensive measures, damming and sealing of the outflow openings are improved.

This object is achieved according to the invention by arranging in the inner tube a rolled-up, self-overlapping damming strip adjoining the wall of the inner tube at least partially. Also, the outflow openings are covered on the outside of the inner tube by a sealing strip having at least two mutually overlapping portions of differing widths.

In one aspect of the invention, in order to dam the outflow openings, there is arranged inside the inner tube a rolled-up, self-overlapping damming strip adjoining the wall at least partially. By adjoining the wall at least partially, it is meant that the damming strip is arranged between a pressure gas-generating charge and the inner wall of the inner tube.

Advantageously, this damming strip is a wide steel strip which lines or covers approximately the entire length of the inner tube. The strip is a resilient, flexible, rupturable thin metal sheet and is rolled-up with an overlap so that the strip expands to engage the wall of the inner tube at least partially. The maximum overlap is expediently not more than the diameter of an outflow opening. Preferably, the overlap is no more than one-half the size or diameter of the outflow opening.

The particular advantage of the inserted damming strip is that a welding or gluing procedure to effect the damming is eliminated. The fitting of the damming strip within the inner tube is extremely easy to perform and can even be automated.

The damming strip produces constant opening gas pressures which are constant at all temperatures. As a result of the adhesive-free fitting, no adhesive constituents are entrained by the expanding, pressure gas-generating charge.

In a second aspect of the invention, in order to effect sealing, the outflow openings are covered on the outside of the inner tube by a sealing strip having at least two mutually overlapping portions of differing widths. The sealing strip is preferably held on the inner tube by an adhesive.

The sealing strip in this case advantageously consists of a portion of smaller width and a portion of greater width, the smaller width being greater than the diameter of an outflow opening. The length of the portion with the smaller width is in this case expediently shorter than the circumference of the inner tube and the length of the portion with the greater width is longer than the circumference of the inner tube. The essential point here is that the portion with the smaller width is overlapped by the portion with the greater width.

Because of this design of the sealing strip, a type of labyrinth seal is created at the overlapping ends of the sealing strip on the inner tube. By this arrangement, the moisture-tightness of the resulting seal is considerably improved. Also, the assembly of the seal is extremely simple.

As an advantageous development, the sealing strip is manufactured from adhesive-coated, i.e. self-adhesive soft aluminum film or foil. Silicone paper can be used as a support for the foil.

The first and second aspects or features of the invention heretofore specified may expediently combined together.

In addition, the inner tube advantageously has a constriction arranged in the region of the outflow openings. This constriction forms an expansion space for the expanding gas between the inner tube and the filter element(s). This prevents the filter elements from being destroyed by a concentrated outflow of the expanding gas. The loading capacity of the generator is not adversely affected. Also, the thin sealing strip over the outflow openings which is situated in the constriction is effectively protected against damage when the filter element (filter wrap) is slipped on.

Advantageously, the gas generator is a tubular gas generator.

BRIEF DESCRIPTION OF THE DRAWINGS

Other features of the invention are shown by the accompanying drawings in which

FIG. 1 shows a gas generator according to the invention, in a longitudinal section;

DETAILED DESCRIPTION OF THE INVENTION

Figure 2A:
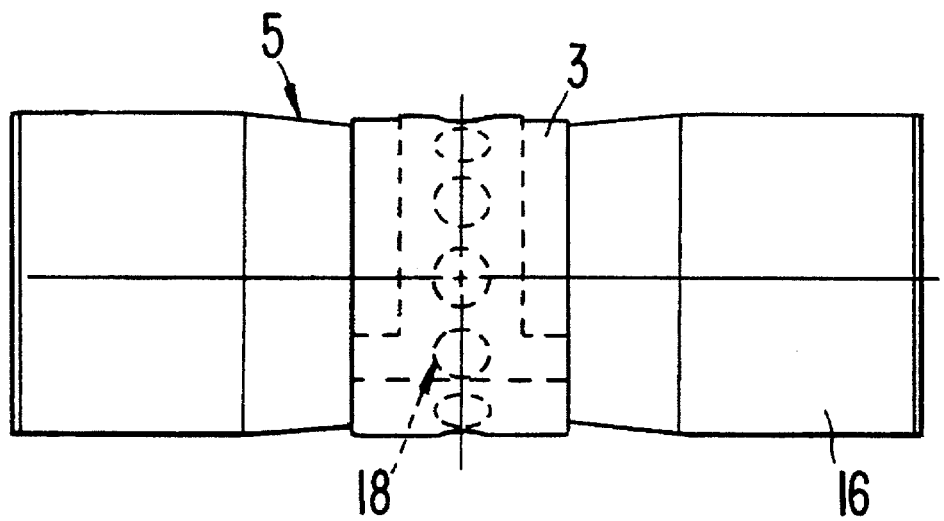
FIGS. 2a and 2b show an inner tube of a gas generator with fitted damming strip and with adhesively attached sealing strip including a constriction, respectively.

Shown in FIG. 1 is a tubular gas generator 6, especially for a motor vehicle occupant impact protection cushion (also known as an "airbag"). The tubular gas generator 6 has an outer tube 12 comprising a casing made of highgrade steel, several gas exit openings 14 being formed in the casing of the outer tube. The gas exit openings 14 are evenly distributed over four peripheral lines or rows of the outer tube 12. The gas exit openings 14 are essentially located in the outer portion of the outer tube 12—as viewed in the axial longitudinal extension of the tubular gas generator 6. Housed inside the outer tube 12 is an inner tube 16, arranged coaxially in relation to the outer tube and having a casing made of highgrade steel. Outflow openings 18 are similarly formed in the middle of the casing of the inner tube 16; these outflow openings 18 being evenly distributed on a circumferential line of the inner tube 16. There is thus an axial distance between the gas exit openings 14 of the outer tube 12 and the outflow openings 18 of the inner tube 16.

The outer diameter of the inner tube 16 is smaller than the inner diameter of the outer tube 12, with the result that, as already described, there is an annular space 20 arranged between the outer tube 12 and the inner tube 16. This annular space 20 is filled with filter elements 22 (highgrade steel wire mesh mats). These elements may be formed as a unit, e.g. a continuous spiral or winding, that can be inserted into the annular space.

The inner tube 16 is filled with gas-generating material 24, for example, sodium azide based, which produces pressure gas when it burns. The gas-generating material 24, also referred to as a pressure gas-generating charge, is in the form of so-called pellets which are housed randomly in the inner tube 16. An electrical igniter unit 26 for igniting the pressure gas-generating charge 24 is fixed to the outer and the inner tubes 12, 16 and protrudes through an opening in the inner tube 16 partially into the inner tube. The igniter unit 26 is joined to an electronic system 40 for actuating the igniter unit by means of a connector 7.

The tubular gas generator 6 is closed at the end faces of the outer tube 12 by disc-like closing covers 28. Arranged at the ends of the inner tube 16 are spring-resilient, compressible disc elements 27 which are made of ceramic felt or fabric and which are supported, on the one hand, against the pellets and, on the other hand, against the inner surfaces of the closing covers 28, the disc elements holding the pellets together with spring force. The function of the resilient disc elements 27 is to compensate the filling capacity tolerances of the inner tube 16 and to hold the pellets together even when the inner tube 16 is not completely filled with gas-generating material or when, in the course of time, the packing density of the pellets increases as a result of vibrations. The closing covers 28 are made of aluminum and also hold or position the inner tube 16 in a manner which is known but which is not described in more detail here.

Arranged between the gas-generating material 24, or the pellets, and the inner tube 16 is a rolled-up, self overlapping damming strip 2. This damming strip 2 lines the whole axial length of the inner tube 16 and is made of high-grade steel. The damming strip 2 has a thickness on the order of 0.075 mm. It will be appreciated that the thickness of the strip can be varied in a manner known to those skilled in the art depending upon the gas-generating material, the size of the openings and the load of the gas generator.

The outflow openings 18 are covered from the outside by a sealing strip 3 which is located in a constriction or narrowed portion 5 of the inner tube 16. The damming strip 2 and the sealing strip 3 are described in more detail with reference to FIGS. 2 and 3.

The way in which the tubular gas generator 6, shown in FIG. 1, operates is described as follows:

The electrical igniter unit 26, which is a so-called layer bridge igniter with priming material for example, is ignited by a defined electrical pulse. When the tubular gas generator 6 shown in FIG. 1 is used as a pressure gas generator in a vehicle airbag, this electrical pulse is applied to the igniter unit 26, for instance by the closing of an inertia switch, in the event of a collision between the motor vehicle and another object. A so-called amplifying or booster charge in the igniter unit 26 is ignited; the clouds of ignition gases produced as a result (fire, gas, hot combustion products) pass via openings (not shown) provided in the housing of the igniter unit 26 into the inside of the inner tube 16 where the gases uniformly and simultaneously ignite the gas-generating pellets. Depending on the make up of the propellant forming the charge, a varying quantity of gas-generating material in the inner tube 16 is converted into gas with a pressure of about 200 bar. The hot gases, about 95% of which is nitrogen, pass from the inner tube via the outflow openings 18 to the filter elements 22. The function of the filter elements 22 is to cool the gases and cleanse them of particles (solids) and condensates. The gases, cooled down and purified in this way, pass out via the gas exit openings 14 in the outer tube 12. The gas generator described here, having a test volume of 60 dm$^3$, generates a gas pressure of about 2 bar at room temperature in a period of about 50 milliseconds.

Before the hot gases can leave the inner tube 16 through the outflow openings 18, the gas pressure must be high enough for the damming strip 2 to be torn open (ruptured) and for the gases to discharge through openings 18. The sealing strip 3 tears open immediately as it only serves as a seal against moisture.

Figure 2B:
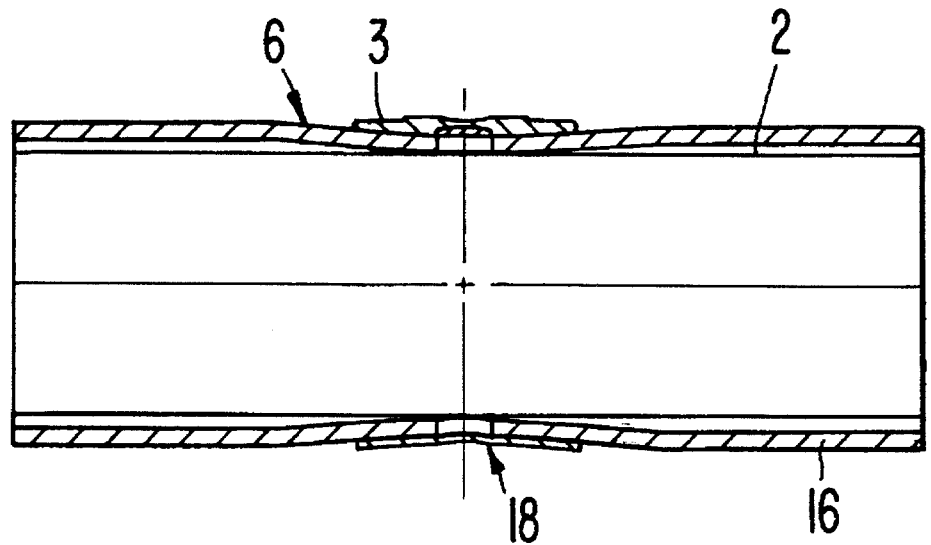

The inner tube 16 is shown in an exterior view in FIG. 2a and in section in FIG. 2b, having a fitted damming strip 2 and an applied sealing strip 3. Because of the constriction 5, the damming strip 2 initially only adjoins or contacts the inner tube 16 in the region of the constriction 5. The damming strip 2 is radially loaded towards the exterior in any case by the gas pressure created by combustion of the gas-generating material and then adjoins the inner tube 16 completely. In this manner the constriction helps seal the damming strip. The outflow openings 18 are arranged in the middle of the constriction 5 on a circumferential line. These outflow 18 openings are covered from the outside by the sealing strip 3.

Figure 3:
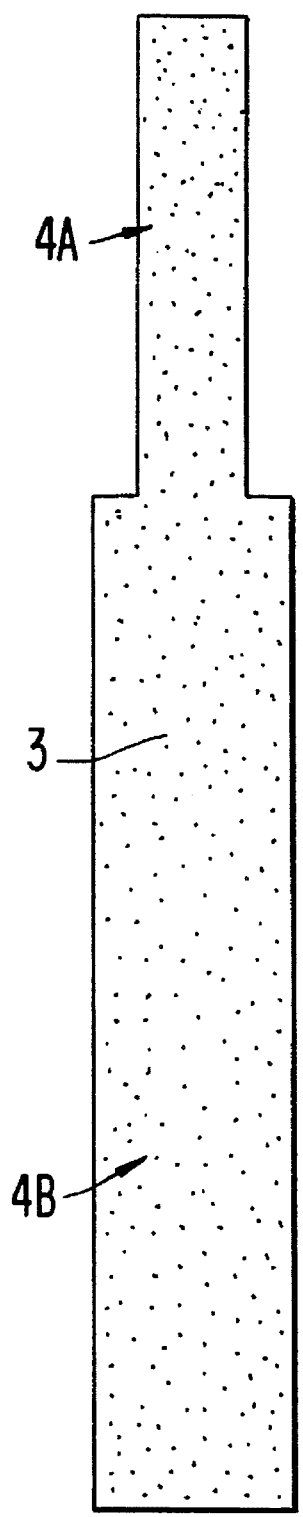
FIG. 3 shows a plan view of a sealing strip.

FIG. 3 shows this sealing strip 3 in plan view. The sealing strip 3 consists of a portion of smaller width 4a and a portion of greater width 4b. The portion with the smaller width 4a is first preferably glued or adhesively bonded in the peripheral direction on top of the outflow openings. For this purpose the sealing strip 3 comprises an aluminum foil provided on one side with a known adhesive. It will be understood that other adhesively bonded strips made of other sealing materials such as plastic, treated paper and the like may be used. When the inner tube 16 has been encircled once by the sealing strip 3, the portion with the greater width 4b should overlap the portion with the smaller width 4a.

The overlapping portions thereby form a type of labyrinth seal.

What is claimed is:

1. A gas generator, for an airbag of a vehicle, which comprises a cylindrical outer tube having gas discharge openings arranged around portions of its periphery, open end faces of the outer tube being closed by cover elements, an inner tube of smaller diameter which is arranged coaxially inside the outer tube and which has outflow openings, an ignitable gas-generating material inside the inner tube, filter elements in an annular space arranged between the inner tube and the outer tube, and an igniter unit for igniting the gas-generating material, and a damming strip arranged inside the inner tube to dam the outflow openings, said damming strip adjoining a wall of the inner tube at least partially and comprising a rolled-up, self-overlapping strip of resilient rupturable thin metal having one portion overlapping another portion, and completely covering the outflow openings.

2. A gas generator according to claim 1, wherein the damming strip is a steel strip which is ruptured by the gas pressure generated by the gas-generating material.

3. A gas generator according to claim 1, wherein the damming strip lines approximately the entire length of the inner tube.

4. A gas generator according to claim 2, wherein the damming strip lines approximately the entire length of the inner tube.

5. A gas generator according to claim 1, wherein a maximum self-overlap of the one portion over the another portion of the damming strip is not more than a diameter of an outflow opening.

6. A gas generator according to claim 1, further comprising a sealing strip covering the outflow openings of the inner tube on the outside of the inner tube, said sealing strip having at least two mutually overlapping portions of different widths.

7. A gas generator according to claim 6, wherein the sealing strip consists of a portion of smaller width and a portion of greater width, the smaller width being greater than a diameter of an outflow opening.

8. A gas generator according to claim 7, wherein the length of the portion with the smaller width is shorter than the circumference of the inner tube.

9. A gas generator according to claim 7, wherein the length of the portion with the greater width is longer than the circumference of the inner tube and is arranged over the portion with the smaller width.

10. A gas generator according to claim 8, wherein the length of the portion with the greater width is longer than the circumference of the inner tube and is arranged over the portion with the smaller width.

11. A gas generator according to claim 6, wherein the sealing strip comprises an adhesive coated soft aluminum foil.

12. A gas generator according to claim 1, wherein the inner tube has a constriction arranged in a region of the outflow openings.

13. A gas generator according to claim 1, wherein the gas generator is a tubular gas generator operatively associated with means for effecting ignition of said igniter unit.

14. A gas generator according to claim 12, wherein a portion of the damming strip contacts the inner tube at the constriction arranged in the region of the outflow openings.

15. A gas generator according to claim 14, wherein the damming strip extends approximately the entire length of the inner tube.

16. A gas generator according to claim 14, wherein remaining portions of the damming strip are spaced from the inner tube.

17. A gas generator according to claim 15, wherein remaining portions of the damming strip are spaced from the inner tube.

18. A gas generator according to claim 1, wherein the outflow openings are arranged around a central region of the inner tube.

\* \* \* \* \*